(12) United States Patent
Akashi et al.

(10) Patent No.: US 7,796,323 B2
(45) Date of Patent: Sep. 14, 2010

(54) DISPLAY PARTICLE AND METHOD FOR PRODUCING THE SAME, DISPLAY PARTICLE DISPERSION, DISPLAY MEDIUM, AND DISPLAY DEVICE

(75) Inventors: Ryojiro Akashi, Kanagawa (JP); Jun Kawahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 102 days.

(21) Appl. No.: 12/241,750

(22) Filed: Sep. 30, 2008

(65) Prior Publication Data
US 2009/0201569 A1 Aug. 13, 2009

(30) Foreign Application Priority Data
Feb. 7, 2008 (JP) .............................. 2008-027484

(51) Int. Cl.
G02B 26/00 (2006.01)
B32B 27/28 (2006.01)
B32B 5/16 (2006.01)

(52) U.S. Cl. .................. 359/296; 428/407; 428/327

(58) Field of Classification Search ................ 359/296; 428/327, 402, 405, 407; 525/326.1, 327.3, 525/327.4, 329.7
See application file for complete search history.

(56) References Cited

U.S. PATENT DOCUMENTS

| | | | |
|---|---|---|---|
| 4,806,443 A | 2/1989 | Yanus et al. | |
| 6,034,033 A | 3/2000 | Aono et al. | |
| 2003/0206330 A1 | 11/2003 | Nomoto et al. | |
| 2005/0227155 A1 | 10/2005 | Minami | |
| 2009/0286923 A1 | 11/2009 | Kirino | |

FOREIGN PATENT DOCUMENTS

| | | | |
|---|---|---|---|
| JP | A-10-329427 | | 12/1998 |
| JP | A-2002-212423 | | 7/2002 |
| JP | A-2003-15168 | | 1/2003 |
| JP | A-2003-131420 | | 5/2003 |
| JP | A-2004-4741 | | 1/2004 |
| JP | A-2004-43342 | | 2/2004 |
| JP | A-2004-279732 | | 10/2004 |
| JP | A-2005-265938 | | 9/2005 |
| JP | A-2005-300969 | | 10/2005 |
| JP | A-2007-63463 | | 3/2007 |
| JP | 2007-163638 A | * | 6/2007 |
| JP | A-2007-163638 | | 6/2007 |
| JP | B2-3936588 | | 6/2007 |
| JP | A-2007-334126 | | 12/2007 |
| JP | A-2008-122468 | | 5/2008 |

OTHER PUBLICATIONS

Office Action issued on Feb. 9, 2010 in Japanese Application No. 2008-027484 (with translation).

* cited by examiner

*Primary Examiner*—David N Spector
(74) *Attorney, Agent, or Firm*—Oliff & Berridge, PLC

(57) ABSTRACT

A display particle includes: a colored particle including a polymer having a charging group and a colorant; and a reactive silicone polymer or a reactive long-chain alkyl polymer, the polymer being bound to or covering the surface of the colored particle.

20 Claims, 3 Drawing Sheets

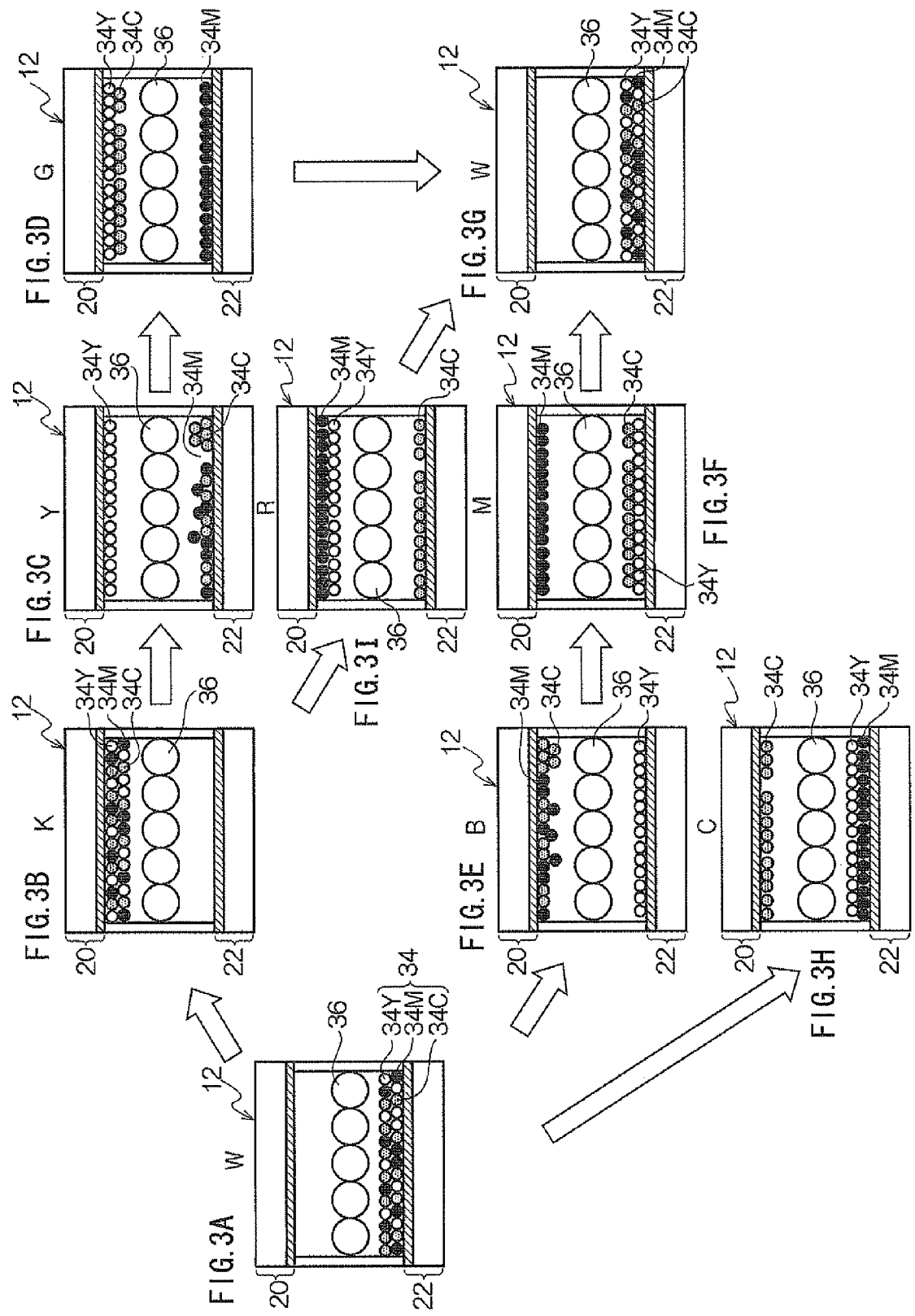

DISPLAY PARTICLE AND METHOD FOR PRODUCING THE SAME, DISPLAY PARTICLE DISPERSION, DISPLAY MEDIUM, AND DISPLAY DEVICE

CROSS-REFERENCE TO RELATED APPLICATION

This application claims priority under 35 USC 119 from Japanese Patent Application No. 2008-027484 filed on Feb. 7, 2008.

BACKGROUND

1. Technical Field

The invention relates to a display particle and a method for producing the same, a display particle dispersion, a display medium, and a display device.

2. Related Art

Electrophoresis display media have been actively examined as displays having a memory property. In this display system, an electrophoresis material having charged colored particles (i.e. electrophoresis particles) dispersed in a liquid is used for displaying by migrating the electrophoresis particles alternately to a visual face and a back face in a cell (which is formed by sealing the electrophoresis material in a space between two opposing electrode substrates) by applying an electric field.

In this technology, the electrophoresis material is an important element, and various techniques with respect thereto have been developed. As the liquid for dispersing the particles, there is a demand for a material having low volatility and high stability as a chemical substance. Preferable examples of a highly safe liquid such as this include paraffin hydrocarbon solvents, which are petroleum-derived components that have a high boiling point, (for example, commercial products such as ISOPAR materials manufactured by Exxon Corporation), silicone oils, and fluorine-containing liquids. There is also a demand for a material including particles which are stably dispersed in such a liquid and which have excellent charging properties and electrophoresis properties. Silicone oils in particular are useful in this respect because they have low volatility and combustibility and are highly safe.

However, a material in which particles are stably dispersed in silicone oil and have stable charging properties has not been widely known.

SUMMARY

According to an aspect of the invention, there is provided a display particle, including:

a colored particle including a polymer having a charging group and a colorant; and a reactive silicone polymer or a reactive long-chain alkyl polymer, the polymer being bound to or covering the surface of the colored particle.

BRIEF DESCRIPTION OF THE DRAWINGS

Exemplary embodiments of the present invention will be described in detail based on the following figures, wherein:

FIGS. 3A to 3I are explanatory drawings schematically showing the relationship between the embodiments of the voltage to be applied between substrates in a display medium and the embodiments of particle migration.

DETAILED DESCRIPTION

Figure 1:
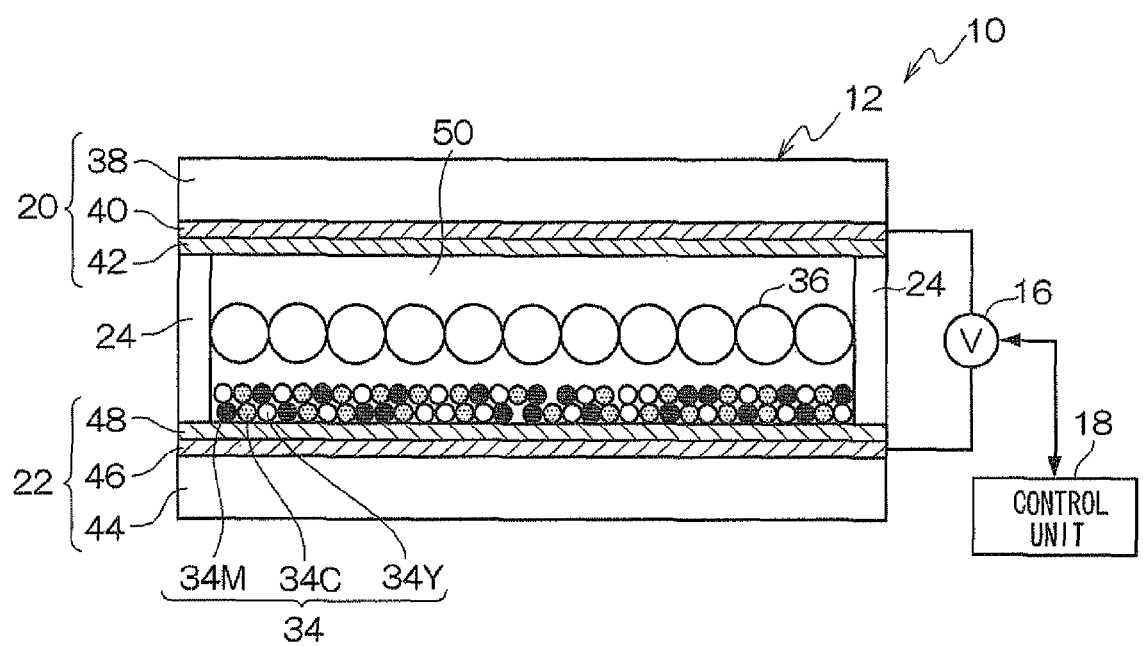
FIG. 1 is a schematic configurational view of a display device according to an exemplary embodiment of the present invention.

Hereinafter, exemplary embodiments of the invention will be described.

Display Particles and Display Particle Dispersion

The display particle dispersion according to an exemplary embodiment of the invention may include a particle group including display particles which migrate according to an electric field and a dispersion medium in which the display particles are disperse. Each of the display particles (i.e. display particles according to an exemplary embodiment of the invention) may include: a colored particle including a polymer having a charging group and a colorant; and a reactive silicone polymer or reactive long-chain alkyl polymer which is bound to the surface of the colored particle or covers the surface of the colored particle. That is, the display particles according to the exemplary embodiment may be (1) display particles having a reactive silicone polymer which is bound to the surfaces of colored particles or covers the surfaces of the colored particles, or (2) display particles having a reactive long-chain alkyl polymer which is bound to the surfaces of colored particles or covers the surfaces of the colored particles. The dispersion medium used herein may be the same as a first solvent used in a method for producing the particles as described later.

The display particles according to the exemplary embodiment of the invention migrate according to an electric field, have charging properties when dispersed in a dispersion medium, and migrate in the dispersion medium according to a formed electric field. Given the constitution described above, the display particles according to the exemplary embodiment of the invention have stable dispersibility and stable charging properties. The charging properties refer to the charging polarity and charge amount of the particles.

When the particle group in the display particle dispersion includes plural kinds of display particles having different charging polarities (that is, the particle group includes plural kinds of display particles having different charging polarities according to the exemplary embodiment of the invention), a system may be provided in which plural kinds of display particles having different charging polarities are mixed. Plural kinds of display particles having different charging polarities may be obtained, for example, by changing a charging group held by a polymer described later.

First, the colored particles are described. Each of the colored particles may include a polymer having a charging group and a colorant, and may additionally include one or more other materials as necessary.

The polymer having a charging group may be a polymer having, for example, a cationic or anionic group as a charging group. Examples of the cationic group as a charging group include an amino group, a quaternary ammonium group, and salts of these groups, and this cationic group imparts a positive polarity to the particles. Examples of the anionic group as a charging group include a phenol group, a carboxyl group, a carboxylic acid base, a sulfonic acid group, a sulfonic acid base, a phosphoric acid group, a phosphoric acid base, and a tetraphenylboron group, and salts of these groups, and this anionic group imparts a negative charging polarity to the particles.

Specifically, the polymer having a charging group may be, for example, a homopolymer of a monomer having a charging group or a copolymer of at least one monomer having a charging group and at least one different monomer (i.e. a monomer having no charging group).

Examples of the monomer having a charging group includes a monomer having a cationic group (which may be referred to hereinafter as a cationic monomer) and a monomer having an anionic group (which may be referred to hereinafter as an anionic monomer).

Examples of the cationic monomer include (meth)acrylates having an aliphatic amino group, such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-ethylaminoethyl(meth)acrylate, N-octyl-N-ethylaminoethyl(meth)acrylate, and N,N-dihexylaminoethyl(meth)acrylate; aromatic group-substituted ethylene monomers having a nitrogen-containing group, such as dimethylaminostyrene, diethylaminostyrene, dimethylaminomethylstyrene, and dioctylaminostyrene;

nitrogen-containing vinyl ether monomers such as vinyl-N-ethyl-N-phenylaminoethyl ether, vinyl-N-butyl-N-phenylaminoethyl ether, triethanolamine divinyl ether, vinyl diphenyl aminoethyl ether, N-vinylhydroxyethyl benzamide, and m-aminophenyl vinyl ether; pyrroles such as vinyl amine and N-vinyl pyrrole; pyrrolines such as N-vinyl-2-pyrroline and N-vinyl-3-pyrroline; pyrrolidines such as N-vinylpyrrolidine, vinylpyrrolidine amino ether, and N-vinyl-2-pyrrolidone; imidazoles such as N-vinyl-2-methylimidazole; imidazolines such as N-vinylimidazoline; indoles such as N-vinylindole; indolines such as N-vinylindoline; carbazoles such as N-vinylcarbazole and 3,6-dibromo-N-vinylcarbazole; pyridines such as 2-vinylpyridine, 4-vinylpyridine, and 2-methyl-5-vinylpyridine; piperidines such as (meth)acrylpiperidine, N-vinylpiperidone, and N-vinylpiperazine; quinolines such as 2-vinylquinoline and 4-vinylquinoline; pyrazoles such as N-vinylpyrazole and N-vinylpyrazoline; oxazoles such as 2-vinyloxazole; and oxazines such as 4-vinyloxazine and morpholinoethyl(meth)acrylate.

Among these, examples of the cationic monomers that are particularly preferable from the viewpoint of general versatility include the (meth)acrylates having an aliphatic amino group, such as N,N-dimethylaminoethyl(meth)acrylate and N,N-diethylaminoethyl(meth)acrylate, and they may be used in the form of a quaternary ammonium salt before or after polymerization. The quaternary ammonium salt can be obtained by reacting the above-mentioned compound with an alkyl halide or tosyl ester.

Examples of the anionic monomers include:

carboxylic acid monomers such as (meth)acrylic acid, crotonic acid, itaconic acid, maleic acid, fumaric acid, citraconic acid, and anhydrides thereof, as well as monoalkyl esters thereof, and vinyl ethers having a carboxyl group, such as carboxyethyl vinyl ether or carboxypropyl vinyl ether;

sulfonic acid monomers such as styrenesulfonic acid, 2-acrylamide-2-methylpropanesulfonic acid, 3-sulfopropyl (meth)acrylic acid ester, bis-(3-sulfopropyl)-itaconic acid ester and salts thereof, 2-hydroxyethylethyl(meth)acrylic acid sulfuric monoester and salts thereof; and phosphonic acid monomers such as vinylphosphonic acid, vinyl phosphate, acid phosphoxyethyl(meth)acrylate, acid phosphoxypropyl(meth)acrylate, bis(methacryloxyethyl) phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

The anionic monomers are preferably those having (meth) acrylic acid or sulfonic acid, and more preferably those in the form of an ammonium salt before or after polymerization. The quaternary ammonium salt can be obtained by reaction with a tertiary amine or a quaternary ammonium hydroxide.

In the present invention, the term "(meth)acrylate" may indicate either acrylate or methacrylate.

Examples of the another monomer include nonionic monomers such as (meth)acrylonitrile, (meth)acrylic acid alkyl ester, (meth)acrylamide, ethylene, propylene, butadiene, isoprene, isobutylene, N-dialkyl-substituted (meth)acrylamide, styrene, vinyl carbazole, styrene derivatives, polyethylene glycol mono(meth)acrylate, vinyl chloride, vinylidene chloride, isoprene, butadiene, vinyl pyrrolidone, hydroxyethyl (meth)acrylate, and hydroxybutyl(meth)acrylate.

The copolymerization ratio of the monomer having a charging group to another monomer (i.e. monomer having a charging group:another monomer) may be changed appropriately depending on the desired charge amount of the particles. Usually, the copolymerization ratio of the monomer having a charging group to another monomer may be selected from the range of from 1:100 to 100:0 in terms of molar ratio.

The weight-average molecular weight of the polymer having a charging group is desirably 1,000 to 1,000,000, more desirably 10,000 to 200,000.

Now, the colorant is described. Examples of the colorant include organic or inorganic pigments and oil-soluble dyes. Specific examples of the colorant include known colorants such as magnetic powders (such as magnetite and ferrite), carbon black, titanium oxide, magnesium oxide, zinc oxide, a phthalocyanine copper-containing cyan coloring material, an azo yellow coloring material, an azo magenta coloring material, a quinacridone magenta coloring material, a red coloring material, a green coloring material, and a blue coloring material. Representative examples thereof include aniline black, calcoyl blue, chrome yellow, ultramarine blue, DuPont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3.

The amount of the colorant to be formulated is desirably from 10 to 99% by weight, and more desirably from 30 to 99% by weight, with respect to the amount of the polymer having a charging group.

Then, the one or more other materials are described. Examples of the one or more other materials include a charge control agent and a magnetic material.

Examples of the charge control agent include known charge control agents used in conventional electrophotographic toner materials, such as: cetylpyridium chloride; quaternary ammonium salts such as BONTRON P-51, BONTRON P-53, BONTRON E-84, and BONTRON E-81 (all registered names, manufactured by Oriental Chemical Industries Ltd.); salicylic acid metal complexes; phenolic condensates; tetraphenolic compounds; metal oxide particles; and metal oxide fine particles surface-treated with various coupling agents.

As the magnetic material, organic and inorganic magnetic materials which are color-coated as appropriate may be used. Moreover, transparent magnetic materials, particularly transparent organic magnetic materials are more preferred because they do not inhibit the color development of the coloring pigments and have lower specific gravity than the inorganic magnetic materials.

An example of the colored magnetic material (i.e. color-coated material) is the small diameter colored magnetic powder as described in JP-A No. 2003-131420. A particle having a magnetic particle as a core and a colored layer disposed on the surface of the magnetic particle may be used. The colored layer may be appropriately selected from, for example, a layer including the magnetic powder colored with a non-transmitting pigment or the like, and a light-interference thin film. The light-interference thin film is a thin film of an achromatic color material such as $SiO_2$ and $TiO_2$, which has a thickness equivalent to light wavelength, and selectively reflects a specific wavelength of light by the light interference within the thin film.

Then, the reactive silicone polymer and the reactive long-chain alkyl polymer which are bound to the surfaces of colored particles or cover the surfaces of colored particles are described.

The reactive silicone polymer and the reactive long-chain alkyl polymer are reactive dispersants as described below.

An example of the reactive silicon polymer is a copolymer including the following components: A. a silicone chain component, B. a reactive component, and C. another copolymerizable component.

A. Silicone Chain Component

Examples of the silicone chain component include dimethyl silicone monomers having a (meth)acrylate group at one terminus thereof, and specific examples of the monomers include SILAPLANE FM-0711, SILAPLANE FM-0721, and SILAPLANE FM-0725 (all trade names, manufactured by Chisso Corporation) and X-22-174DX, X-22-2426, and X-22-2475 (all trade names, manufactured by Shin-Etsu Silicone Co., Ltd.).

B. Reactive Component

Examples of the reactive component include glycidyl (meth)acrylate having epoxy group and isocyanate monomers having isocyanate group such as KARENZ AOI and KARENZ MOI (all registered names, manufactured by Showa Denko K.K.).

C. Another Copolymerizable Component

Examples of the another copolymerizable component include alkyl(meth)acrylates such as methyl(meth)acrylate, ethyl(meth)acrylate, propyl(meth)acrylate, and butyl(meth)acrylate, hydroxyethyl(meth)acrylate, hydroxybutyl(meth)acrylate, a monomer having an ethylene oxide unit (for example, an alkyloxyoligoethylene glycol(meth)acrylate such as tetraethylene glycol monomethyl ether (meth)acrylate), a (meth)acrylate having polyethylene glycol at a terminus thereof, (meth)acrylic acid, maleic acid, and N,N-dialkylamino(meth)acrylate.

The reactive silicone polymer includes the components A and B, and may include the component C as a copolymerizable component if necessary. The three components are copolymerized in such a proportion that the silicone chain component A is preferably 80 wt % or more, and more preferably 90 wt % or more. When the proportion of the non-silicone chain components is more than 20 wt % or more, surfactant ability may be reduced, and thus the size of formed particles may be increased, and the formed particles may easily be aggregated. The proportion of the reactive component B may be in the range of from 0.1 to 10 wt %. When the proportion of the reactive component B is more than 10 wt %, its reactive groups may remain on the formed electrophoresis particles to cause aggregation of the particles. When the proportion of the reactive component B is less than 0.1 wt %, its binding to particle surfaces may be insufficient.

Examples of the reactive silicone compound other than those copolymers include silicone compounds having an epoxy group at one terminus thereof, such as X-22-173DX (trade name, manufactured by Shin-Etsu Silicone Co., Ltd.). Of those, preferable are copolymers each including at least two components, one of which is selected from dimethyl silicone monomers having a (meth)acrylate group at one terminus thereof, such as SILAPLANE FM-0711, SILAPLANE FM-0721, and SILAPLANE FM-0725 (all trade names, manufactured by Chisso Corporation) and X-22-174DX, X-22-2426, and X-22-2475 (all trade names, manufactured by Shin-Etsu Silicone Co., Ltd.) and the other of which is selected from glycidyl(meth)acrylate and isocyanate monomers, such as KARENZ AOI and KARENZ MOI (all registered names, manufactured by Showa Denko K.K.), from the viewpoints of excellent reactivity and excellent surfactant activity.

The weight-average molecular weight of the reactive silicone polymer is desirably from 1,000 to 1,000,000, or from about 1,000 to about 1,000,000, and more desirably from 10,000 to 1,000,000, or from about 10,000 to about 1,000,000.

The reactive long-chain alkyl polymer may have a similar structure to that of the silicone copolymer, except that a long-chain alkyl(meth)acrylate is used as a long-chain alkyl component A' in place of the silicone chain component A. Examples of the long-chain alkyl (meth)acrylate include those having an alkyl chain having 4 or more carbon atoms, and specific examples thereof include butyl(meth)acrylate, hexyl(meth)acrylate, 2-ethylhexyl (meth)acrylate, dodecyl (meth)acrylate, and stearyl(meth)acrylate. Among them, a copolymer including at least two components, one of which is selected from long-chain alkyl (meth)acrylates and the other of which is selected from glycidyl(meth)acrylate and isocyanate monomers, such as KARENZ AOI and KARENZ MOI (all registered names, manufactured by Showa Denko K.K.), from the viewpoints of excellent reactivity and excellent surfactant activity. The formulation ratio of the components A', B, and C in a copolymer may he selected from the same range as in the reactive silicone polymer.

The reactive "long-chain" alkyl polymer refers, for example, to a polymer having, as a side chain thereof, an alkyl chain having from about 4 to about 30 carbon atoms.

The weight-average molecular weight of the reactive long-chain alkyl polymer is desirably from 1,000 to 1,000,000, and more desirably from 10,000 to 1,000,000.

The reactive silicone polymer or the reactive long-chain alkyl polymer may be bound to the surfaces of colored particles, or cover the surfaces of colored particles. The term "bound" means that a reactive group of the polymer is bound to a functional group (which may also serve as the charging group) present on the surface of a colored particle. The term "cover" means that reactive groups of the reactive polymer cause a reaction such as polymerization with the functional groups present on the surface of a colored particle or with a chemical substance added separately to the system, to form a layer on the surface of the particle thereby covering the surface with the layer. Examples of a method for selectively performing the binding or covering are described hereinbelow. For performing the binding, for example, the reactive silicone polymer or reactive long-chain alkyl polymer having a reactive group that aggressively binds to the functional group (or charging group) may be selected as described above (for example, an acid group, acid base, alcoholate group, or phenolate group may be selected as the functional group present on the particle, and an epoxy group or isocyanate group may be selected as the reactive group). For performing the covering, for example, the reactive silicone polymer or reactive long-chain alkyl polymer having functional groups that may bind to one another with the functional group (or charging group) as a catalyst may be selected (for example, an amino group or ammonium group may be selected as the functional group (or charging group), and an epoxy group may be selected as the reactive group).

The method of binding the reactive silicon polymer or reactive long-chain alkyl polymer onto the surfaces of colored particles, or the method of covering the surfaces of colored particles with the reactive silicon polymer or reactive long-chain alkyl polymer may be carried out by heating or the like. From the viewpoint of dispersibility, the amount of the reactive silicone polymer or reactive long-chain alkyl polymer for binding or covering is preferably in the range of from 2% by weight to 200% by weight with respect to the particles. When the amount is less than 2% by weight, dispersibility of the particles may be deteriorated, while when the amount is 200% by weight or more, there may arise problems such as reduction in the charge amount of the particles.

The binding or covering amount may be determined in the following manner. The binding or covering amount may be determined by subjecting the prepared particles to centrifugal sedimentation, and measuring the weight of the prepared particles to determine the increment of weight with respect to the amount of the particle material. Alternatively, the binding or covering amount may be calculated by analyzing the composition of the particles.

Hereinafter, the method for producing display particles according to an exemplary embodiment of the invention is described.

The method for producing display particles according to the exemplary embodiment of the invention includes: stirring and emulsifying a mixed solution including i) a polymer having a charging group, ii) a colorant, iii) a reactive silicone polymer or a reactive long-chain alkyl polymer, iv) a first solvent, and v) a second solvent which is incompatible with the first solvent, has a boiling point lower than that of the first solvent, and dissolves the polymer having a charging group; removing the second solvent from the emulsified mixed solution to form colored particles including the polymer having a charging group and the colorant; and reacting the reactive silicone polymer or the reactive long-chain alkyl polymer with the colored particles so as to bind onto the surfaces of the colored particles or cover the surfaces of the colored particles. When display particles are prepared by a dry-in-liquid method, the resultant display particles may have particularly stable dispersibility and charging properties.

In this method, a dispersion medium used in the display medium may be used as the first solvent so that the resultant dispersion may be used directly as a display particle dispersion including the display particles and the dispersion medium. In the method for producing the display particles according to the exemplary embodiment, the display particle dispersion including the first solvent as a dispersion medium may be easily prepared through the above process without washing and drying processes. For improving electric characteristics, washing of the particles (i.e. removal of ionic impurities) and replacement of the dispersion medium may also be appropriately carried out.

The method for producing display particles according to the exemplary embodiment is not limited to the process described above. For example, display particles may be produced by a method in which colored particles are formed by a known method (such as the coacervation method, the dispersion polymerization method, or the suspension polymerization method), and then the colored particles may be dispersed in a solvent including a reactive silicone polymer or a reactive long-chain alkyl polymer and reacted with the reactive silicone polymer or the reactive long-chain alkyl polymer, whereby the polymer is bound to the surfaces of the colored particles or covers the surfaces of the colored particles.

Hereinafter, the method for producing display particles according to the exemplary embodiment of the invention is described in detail. Specifically, the respective processes of the method are described in detail.

Emulsification Process

In the emulsification process, for example, two solutions, that is, i) a solution including a first solvent and a reactive silicone polymer or a reactive long-chain alkyl polymer (hereinafter referred to sometimes as a high-boiling solution) and ii) a solution including a polymer having a charging group, a colorant, and a second solvent which is incompatible with the first solvent, has a boiling point lower than that of the first solvent, and dissolves the polymer having a charging group (hereinafter referred to sometimes as a low-boiling solution), are mixed with each other, and the resultant solution mixture is stirred to emulsify the materials. The mixed solutions to be emulsified may also each include one or more materials other than the materials mentioned above (e.g. a charge control agent, a pigment dispersant, or the like) if necessary.

In the emulsification process, the solution mixture is stirred whereby the low-boiling solution may form a disperse phase in the form of droplets in a continuous phase of the high-boiling solution (which includes the first solvent and the reactive polymer), and emulsified. The reactive silicon polymer or the reactive long-chain alkyl polymer may be dissolved in the continuous phase of the high-boiling solution, while the polymer having a charging group and the colorant may be dissolved or dispersed in the low-boiling solution.

In the emulsification process, the respective materials may be mixed one after another in the mixed solutions. For example, a first mixed solution in which the polymer having a charging group, the colorant, and the second solvent are mixed, and a second mixed solution in which the first solvent and the reactive silicone polymer or the reactive long-chain alkyl polymer are mixed may be prepared. Then, the first mixed solution may be dispersed in and mixed with the second mixed solution such that granular droplets of the first mixed solution are dispersed in the second mixed solution, and the solutions are emulsified. Alternatively, for example, the second mixed solution may be prepared by adding monomers that constitute the reactive silicone polymer or the reactive long-chain alkyl polymer to the first solvent, and then polymerizing the monomers to produce the reactive silicone polymer or the reactive long-chain alkyl polymer.

Stirring for emulsification may be conducted by using, for example, a known stirring apparatus (for example, a homogenizer, a mixer, an ultrasonic disintegrator, or the like). For inhibiting an increase in temperature during the emulsification, the temperature of the solution mixture during the emulsification may be kept at from 0° C. to 50° C. For example, the stirring speed of a homogenizer or mixer for emulsification, the output power of an ultrasonic disintegrator, and the emulsification time may vary depending on a desired particle size.

Next, the first solvent is described.

The first solvent may be used as a poor solvent that can form a continuous phase in the solution mixture. Examples of the first solvent include, but are not limited to, petroleum-derived high-boiling solvents such as paraffin hydrocarbon solvents, silicone oils, and fluorine-containing liquids. From the viewpoint of producing display particles having stable dispersibility and charging properties, the first solvent may be a silicone oil when the reactive silicone polymer is used, and the first solvent may be a paraffin hydrocarbon solvent when the reactive long-chain alkyl polymer is used.

Specific examples of the silicone oil include: silicone oils having a hydrocarbon group bound to a siloxane bond, such as dimethyl silicone oil, diethyl silicone oil, methyl ethyl silicone oil, methyl phenyl silicone oil, and diphenyl silicone oil; and modified silicone oils such as fluorine-modified silicone oil, amine-modified silicone oil, carboxyl-modified silicone oil, epoxy-modified silicone oil, and alcohol-modified silicone oil. Among them, dimethyl silicone is particularly desirable from the viewpoints of high safety, high chemical stability, excellent long-term reliability, and high electrical resistivity.

The viscosity of the silicone oil is desirably from 0.1 mPa·s to 20 mPa·s, and more desirably from 0.1 mPa·s to 2 mPa·s, at a temperature of 20° C. When the viscosity falls within this range, the migration speed of particles, that is, display speed may be improved. The viscosity may be determined by using a B-8L viscometer (trade name, manufactured by Tokyo Keiki Co., Ltd.).

Examples of the paraffin hydrocarbon solvent include normal paraffin hydrocarbons having 20 or more carbon atoms (boiling point of 80° C. or more) and iso-paraffin hydrocarbons. From the viewpoints of safety and volatility, iso-paraffin is preferably used. Specific examples thereof include SHELLSOL 71 (registered name, manufactured by Shell Oil Co.), ISOPAR O, ISOPAR H, ISOPAR K, ISOPAR L, ISOPAR G, and ISOPAR M (all trade names, manufactured by Exxon Corporation), and IP Solvent (trade name, manufactured by Idemitsu Kosan Co., Ltd.).

Next, the second solvent is described.

The second solvent may be used as a good solvent that can form a disperse phase in the solution mixture. As the second solvent, a solvent which is incompatible with the first solvent has a boiling point lower than that of the first solvent, and dissolves the polymer having a charging group may be selected. The term "incompatible" as used herein refers to the state in which plural substances form independent phases and do not mix with each other. The term "dissolve" or the like as used herein refers to the state in which an undissolved material cannot be confirmed by visual observation.

Examples of the second solvent include, but are not limited to: water; lower alcohols having 5 carbon atoms or less, such as methanol, ethanol, propanol, and isopropyl alcohol; tetrahydrofuran; acetone; and other organic solvents such as toluene, dimethylformamide, and dimethylacetamide.

Since the second solvent may be removed from the solution mixture system by, for example, heating under reduced pressure, the second solvent may be selected from solvents having a boiling point lower than that of the first solvent. The boiling point of the second solvent is, for example, desirably from 50° C. to 200° C., and more desirably 50° C. to 150° C.

Process of Removing Second Solvent

In the process of removing the second solvent, the second solvent (i.e. low-boiling solvent) may be removed from the solution mixture which has been emulsified in the emulsification process. By removing the second solvent, the polymer having a charging group is precipitated and forms particles while enclosing other materials within the particles in a disperse phase formed by the second solvent, whereby colored particles may be obtained. Various additives such as a pigment dispersant and a weathering stabilizer may also be included in the particles. For example, a polymer substance and a surfactant which disperse the pigment are included in a commercially-available pigment dispersion, and when such a commercially-available pigment dispersion is used, the colored particles may include these substances together with the charge control resin.

Examples of the method of removing the second solvent include a method of heating the solution mixture, a method of depressurizing the solution mixture, and a combination of these methods.

When the second solvent is removed by heating the solution mixture, the heating temperature is desirably, for example, from 30° C. to 200° C., and more desirably from 50° C. to 180° C. By the heating in the process of removing the second solvent, the reactive silicone polymer or the reactive long-chain alkyl polymer may also be reacted with the surfaces of the particles. On the other hand, when the second solvent is removed by depressurizing the solution mixture, the depressurization pressure is desirably from 0.01 to 200 mPa, and more desirably from 0.01 to 20 mPa.

Binding or Covering Process

In the binding or covering process, the reactive silicone polymer or reactive long-chain alkyl polymer may be reacted in the solution (i.e. the first solvent) in which the colored particles have been formed, and may be bound to or cover the surfaces of the colored particles. The reaction may have been advanced by the heat treatment in the process of removing the second solvent, but the biding or covering process ensures sufficient progression of the reaction.

The method in which the polymer is reacted and bound to or covers the surfaces of the colored particles may be selected depending on the type of the polymer, and examples thereof include a method of heating the solution.

When the solution is heated, the heating temperature is, for example, desirably from 50° C. to 200° C., and more preferably from 60° C. to 150° C.

Through the process described above, display particles or a display particle dispersion including the display particles may be obtained. As necessary, the display particle dispersion thus obtained may additionally include an acid, an alkali, a salt, a dispersant, a dispersion stabilizer, a stabilizer for preventing oxidation, for absorbing ultraviolet light, or the like, an antibacterial agent, a preservative, or the like.

Moreover, the display particle dispersion thus obtained may further include a charge control agent such as an anionic surfactant, a cationic surfactant, an amphoteric surfactant, a nonionic surfactant, a fluorine-containing surfactant, a silicone surfactant, a silicone cationic compound, a silicone anionic compound, a metallic soap, an alkyl phosphoric acid ester, or a succinic acid imide.

Examples of the charge control agent include ionic or nonionic surfactants, block or graft copolymers having lipophilic and hydrophilic moieties, compounds having a polymer chain backbone, such as cyclic, star-shaped, or dendritic polymers (dendrimers), metal complexes of salicylic acid, metal complexes of catechol, metal-containing bisazo dyes, tetraphenyl borate derivatives, and copolymers of a polymerizable silicone macromer (for example, SILAPLANE manufactured by Chisso Corporation) and one of an anionic monomer and a cationic polymer.

Specific examples of the ionic or nonionic surfactants include: nonionic surfactants such as polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylolamide; anionic surfactants such as alkylbenzene sulfonate, alkylphenyl sulfonate, alkylnaphthalene sulfonate, higher fatty acid salts, sulfate ester salts of higher fatty acid esters, and sulfonic acids of higher fatty acid esters; and cationic surfactants such as primary to tertiary amine salts and quaternary ammonium salts. The amount of the charge control agent is preferably from 0.01 to 20% by weight or less, and more preferably from 0.05 to 10% by weight, with respect to the solid contents of the particles.

The resultant display particle dispersion may be diluted as necessary with the first solvent (or the first solvent including a dispersant as necessary).

The concentration of the display particles in the display particle dispersion may be selected depending on display characteristics, response characteristics, or application of the dispersion, but is desirably selected from the range of from 0.1% by weight to 30% by weight. When plural kinds of particles having different colors are mixed, the total amount of the particles may fall within this range. When the concentration is lower than 0.1% by weight, a display density may be insufficient, while when the concentration is higher than 30% by weight, there may be problems such as a decrease in display speed and easy aggregation of the particles.

In an exemplary embodiment, a mixture of plural kinds of particles having different colors, different charging polarity, or the like may be used to attain a color display.

According to an exemplary embodiment of the invention, the display particles and the display particle dispersion may be utilized in a display medium in an electrophoresis system, in a liquid toner in an electrophotographic system in a liquid development system, or the like.

Display Medium and Display Device

FIG. 1 is a schematic configurational view showing one example of the display device according to an exemplary embodiment of the invention. The display device of the invention is not limited to the constitution described below.

The display device 10 according to this exemplary embodiment of the invention may include the display particle dispersion according to the above-mentioned exemplary embodiment including the display particles and the dispersion medium (i.e. first solvent) in the above-mentioned exemplary embodiment, as a particle dispersion including a dispersion medium 50 and a particle group 34 in a display medium 12.

As shown in FIG. 1, the display device 10 according to the exemplary embodiment includes a display medium 12, a voltage application unit 16, and a control unit 18. The control unit 18 is connected to the voltage application unit 16 such that a signal can be received and transmitted.

The control unit 18 is configured as a microcomputer that includes a Central Processing Unit (CPU) that controls the operation of the entire unit, a Random Access Memory (RAM) that temporarily stores various types of data, and a Read Only Memory (ROM) on which various types of programs have previously been stored, the programs including a control program for controlling the entire unit, a program represented by a processing routine, and the like.

The display medium 12 corresponds to the display medium of the invention, the display device 10 corresponds to the display device of the invention, and the voltage application unit 16 corresponds to a voltage application unit for the display device of the invention.

The voltage application unit 16 is electrically connected to a surface electrode 40 and a rear surface electrode 46. In the present exemplary embodiment, both the surface electrode 40 and the rear surface electrode 46 are electrically connected to the voltage application unit 16. However, one of the surface electrode 40 and the rear surface electrode 46 may be grounded, and the other may be connected to the voltage application unit 16.

The voltage application unit 16 is a voltage application device that applies a voltage to the surface electrode 40 and the rear surface electrode 46, and applies a voltage, which is controlled by the control unit 18, between the surface electrode 40 and the rear surface electrode 46.

Hereinafter, the display medium 12 is described in detail.

As shown in FIG. 1, the display medium 12 includes a display substrate 20 that serves as a display surface, a rear substrate 22 that is disposed opposite to the display substrate 20 with a gap therebetween, gap members 24 that maintain a certain gap between the substrates and divide the region between the display substrate 20 and the rear substrate 22 into plural cells, and a particle group 34 that is enclosed in each of the cells.

The cell refers to the region enclosed by the display substrate 20, the rear substrate 22, and the gap members 24. A dispersion medium 50 is enclosed in the cell. The particle group 34 (which is described in detail hereinafter) is dispersed in the dispersion medium 50, and migrates between the display substrate 20 and the rear substrate 22 according to the intensity of an electric field formed in the cell.

Moreover, the display medium 12 may be configured so as to allow each of the pixels independently display a color, by providing the gap members 24 corresponding to each pixel in an image displayed on the display medium 12, and forming a cell corresponding to each pixel.

In stead of the structure as shown in FIG. 1, the cell may include capsules each having a dispersion medium, which are enclosed in a substrate. In this case, a pair of substrates is not necessary, and only one substrate may be used.

The particle group 34 including plural particles having different colors is dispersed in the dispersion medium 50 of the display medium 12. The plural particles included in the particle group 34 may be electrophoresed between the substrates, and the absolute value of the voltage necessary for migration of the particles according to an electric field may vary depending on the color of the particles.

The respective plural particles included in the particle group 34, which have different absolute values of the voltage necessary for migration thereof according to an electric field, may be obtained by preparing particle dispersions including particles having different charge amounts by changing, for example, the type of the "ionic polymer" in the method for producing a particle dispersion in the exemplary embodiment, and then mixing the particle dispersions.

The amount (% by weight) of the particle group 34 with respect to the total weight in the cell is not particularly limited as long as a desired hue can be obtained. Regarding the display medium 12, the amount may be controlled according to the cell thickness. Specifically, the amount may be small when a cell is thick, or may be large when a cell is thin, in order to obtain a desired hue. The amount is usually from 0.01% by weight to 50% by weight.

Hereinafter, the respective constituent members of the display medium 12 are described.

The display substrate 20 includes a supporting substrate 38, and a surface electrode 40 and a surface layer 42 which are disposed in this order on the supporting substrate. The rear substrate 22 includes a supporting substrate 44, and a rear surface electrode 46 and a surface layer 48 which are disposed in this order on the supporting substrate.

Examples of the material of the supporting substrate 38 or the supporting substrate 44 include glass and plastics such as a polycarbonate resin, an acrylic resin, a polyimide resin, a polyester resin, an epoxy resin, and a polyether sulfone resin.

Examples of the material of the rear surface electrode 46 or the surface electrode 40 include: oxides of indium, tin, cadmium, and antimony; complex oxides such as ITO; metals such as gold, silver, copper, and nickel; and organic conductive materials such as polypyrrole and polythiophene. These materials may be used as a single layer film, a mixture film, or a composite film, which may be formed by vapor deposition, sputtering, coating, or the like. The thickness of a film formed by vapor deposition or sputtering is usually from 100 to 2000 angstrom. The rear surface electrode 46 and the surface electrode 40 may each be formed into a desired pattern, for example, a matrix form or a stripe form that allows passive matrix driving, by a conventionally known methods such as etching for conventional liquid crystal display elements or printed boards.

The surface electrode 40 may be embedded in the supporting substrate 38. Similarly, the rear surface electrode 46 may be embedded in the supporting substrate 44. In these cases, because the material of the supporting substrate 38 or the supporting substrate 44 may affect the charging properties and flowability of the respective particles of the particle group 34, the material may be properly selected in consideration of the composition and other properties of the particles of the particle group 34.

The rear surface electrode 46 and the surface electrode 40 may be separated from the display substrate 20 and the rear substrate 22, respectively, and disposed outside the display medium 12. In this case, since the display medium 12 is disposed between the rear surface electrode 46 and the surface electrode 40, the distance between the rear surface electrode 46 and the surface electrode 40 increases and the electric field intensity may decrease. Accordingly, in order to obtain a desired intensity of electric field, the thickness of the supporting substrate 38 and the supporting substrate 44 of the display medium 12 may be reduced, or the distance between the supporting substrate 38 and the supporting substrate 44 in the display medium 12 may be reduced.

In the above-described case, the electrodes (i.e. surface electrode 40 and rear surface electrode 46) are provided on both of the display substrate 20 and the rear substrate 22, but an electrode may be provided on one of the substrates.

In order to allow active matrix driving, the supporting substrate 38 and the supporting substrate 44 may each have a thin-film transistor (TFT) for each pixel. A TFT may be formed not on the display substrate but on the rear substrate 22 to make the formation of wiring and the mounting of parts easier.

When the display medium 12 is configured as a passive matrix system, the configuration of the image display device 10, which includes the display medium 12 and which is described below, may be simplified. On the other hand, when the display medium 12 is configured as an active matrix system using a TFT, the display speed is faster than that achieved by a passive matrix.

When the surface electrode 40 and the rear surface electrode 46 are formed on the supporting substrate 38 and the supporting substrate 44 respectively, a surface layer 42 and a surface layer 48, each of which serves as a dielectric film, may be formed as required on the surface electrode 40 and the rear surface electrode 46, respectively, to prevent the breakage of the surface electrode 40 and the rear surface electrode 46 and the leakage between the electrodes which may cause the coagulation of the particles of the particle group 34.

Examples of the material of the surface layer 42 or the surface layer 48 include polycarbonate, polyester, polystyrene, polyimide, epoxy, polyisocyanate, polyamide, polyvinyl alcohol, polybutadiene, polymethyl methacrylate, copolymerized nylon, ultraviolet curable acrylic resin, and fluorocarbon resins.

In addition to these insulating materials, insulating materials in which a charge transfer substance is enclosed may also be used. When a charge transporting substance is included, the charging properties of the particles may be improved by the injection of an electric charge into the particles, and an excessive charge of the particles may be leaked to stabilize the charge of the particles when the particles have an excessively large amount of charge.

Examples of the charge transporting substance include: hole transporting substances such as hydrazone compounds, stilbene compounds, pyrazoline compounds, and aryl amine compounds; electron transporting substances such as fluorenone compounds, diphenoquinone derivatives, pyran compounds, and zinc oxide; and self-supporting resins having charge transporting properties.

Specific examples thereof include polyvinyl carbazole, and polycarbonate obtained by the polymerization of a specific dihydroxy aryl amine and bischloroformate as described in U.S. Pat. No. 4,806,443. Because a dielectric film may affect the charging properties and flowability of the particles, the material may appropriately selected in consideration of the composition and other properties of the particles. The display substrate, which is one of the pair of substrates, may be made of a transparent material selected from these materials because it must transmit light.

The gap member 24 for maintaining a gap between the display substrate 20 and the rear substrate 22 may be formed so as not to impair the transparency of the display substrate 20. Examples of the material of the gap member 24 include a thermoplastic resin, a thermosetting resin, an electron radiation curable resin, a light curable resin, a rubber, and a metal.

The gap member 24 may be in a cell form or a particle form. Examples of the cell-form gap member include nets. Nets are readily available and have a relatively uniform thickness, and thus are useful for producing the display medium 12 at a low cost. Since the nets are not suitable for displaying a fine image, they may be used in a large image display device which does not require high resolution. Examples of the cell form spacer include a sheet holes in matrix form made by etching, laser processing, or the like. Such a sheet is easier to control the thickness, hole shape, hole size and the like than the nets. Therefore, a sheet may be used in a display medium which displays a fine image, for improving contrast.

The gap member 24 may be integrated with at least one of the display substrate 20 and the rear substrate 22. For example, the supporting substrate 38 or the supporting substrate 44 may be subjected to etching, laser processing, pressing with a premold die, printing, or another treatment to form cell patterns of a desirable size, whereby the supporting substrate 38, the supporting substrate 44, and the gap member 24 may be formed.

In this case, the gap member 24 may be provided on the display substrate 20 or the rear substrate 22, or on both of them.

The gap member 24 may be colored or colorless, but is preferably colorless and transparent so as not to adversely affect the image which is displayed on the display medium 12. In that case, for example, transparent resins such as polystyrene, polyester, and acryl resins may be used as the member.

The gap member 24 in particle form may be transparent, and examples thereof include particles of transparent resins such as polystyrene, polyester, or acryl resins, and glass particles.

In the display medium 12, insulating particles 36 are enclosed in each cell. The insulating particles 36 may be insulating particles having a color different from that of the particle group 34 enclosed in the same cell. The insulating particles 36 may be disposed in the direction substantially perpendicular to the opposing direction of the rear substrate 22 and the display substrate 20, with gaps through which the particles of the particle groups 34 can pass. In addition, gaps are provided between the insulating particle 36 and the rear substrate 22, and between the display substrate 20 and the insulating particle 36, which allow the particles of the particle group 34 enclosed in the same cell are disposed into layers in the opposing direction of the rear substrate 22 and the display substrate 20.

The particles of the particle group 34 may migrate from the rear substrate 22 side to the display substrate 20 side, or from the display substrate 20 side to the rear substrate 22 side, through the gaps between the insulating particles 36. The color of the insulating particle 36 may be, for example, white or black so as to be a background color.

Examples of the insulating particles 36 include: spherical particles of benzoguanamine-formaldehyde condensate, spherical particles of benzoguanamine-melamine-formaldehyde condensate, and spherical particles of melamine-formaldehyde condensate (registered name: EPOSTAR, all manufactured by Nippon Shokubai Co., Ltd.); spherical fine particles of crosslinked polymethyl methacrylate containing titanium oxide (trade name: MBX-WHITE, manufactured by Sekisui Plastics Co., Ltd.); spherical fine particles of crosslinked polymethyl methacrylate (registered name: CHEMISNOW MX, manufactured by Soken Chemical & Engineering Co., Ltd.); fine particles of polytetrafluoroethylene (trade name: LUBRON L, manufactured by Daikin Industries, Ltd., trade name: SST-2, manufactured by Shamrock Technologies Inc.); fine particles of carbon fluoride (trade name: CF-100, manufactured by Nippon Carbon Co., Ltd., trade names: CFGL and CFGM, both manufactured by Daikin Industries, Ltd.); silicone resin fine particles (registered name: TOSPEARL, manufactured by Toshiba Silicone K.K.); fine particles of polyester containing titanium oxide (trade name: BIRYUSHIA PL 1000 WHITE T, manufactured by Nippon Paint Co., Ltd.); polyester-acrylic fine particles containing titanium oxide (trade name: KONAC No. 181000 WHITE, manufactured by NOF CORPORATION); and spherical fine particles of silica (trade name: HIPRESICA, manufactured by UBE-NITTO KASEI Co., Ltd.). The insulating particles are not limited to these particles, but may be those obtained by dispersing a white pigment such as titanium oxide in a resin, grinding, and classifying into a desired particle size.

Since the insulating particles 36 are provided between the display substrate 20 and the rear substrate 22 as described above, the insulating particles 36 may have a volume average primary particle size of from 1/5 to 1/50 relative to the length of the opposing direction of the display substrate 20 and the rear substrate 22, and the amount of the insulating particles 36 may be from 1% by volume to 50% by volume with respect to the volume of the cell.

The size of the cell in the display medium 12 is closely related to the resolution of the display medium 12, and a smaller cell size may provide a display medium having higher resolution. The size of the cell may be from about 10 µm to about 1 mm.

The display substrate 20 or the rear substrate 22 may be fixed by using fixing units such as a combination of bolts and nuts, a clamp, a clip, and a frame for fixing substrate. Moreover, fixing agents or methods such as an adhesive, heat fusion, and ultrasonic bonding may also be used.

The display medium 12 may be used for bulletin boards, circulars, electronic whiteboards, advertisements, signboards, blinking markers, electronic paper, electronic newspaper, and electronic books, on which images can be stored and rewritten, and document sheets which can be shared between copiers and printers.

The display medium 12 may display different colors by changing the voltage (V) applied between the display substrate 20 and the rear substrate 22.

In the display medium 12, colored particles migrate according to the electric field formed between the display substrate 20 and the rear substrate 22, whereby each cell of the display medium 12, which corresponds to a pixel, may independently display a color corresponding to each pixel of the image data.

Figure 2:
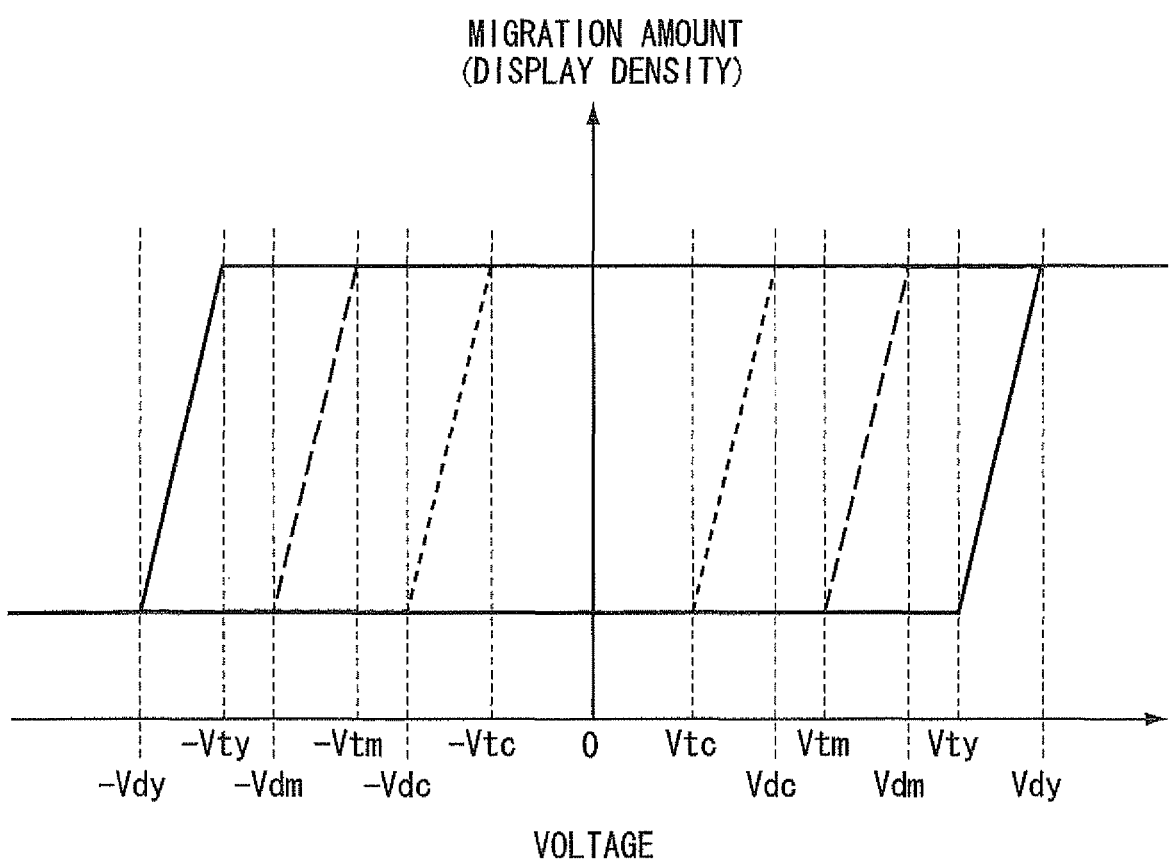
FIG. 2 is a diagram schematically showing the relationship between the voltage to be applied and the amount of particles migrated (display density)

As shown in FIG. 2, the absolute values of the voltage necessary to migrate the particles of the particle group 34, which have different colors and are electrophoresed between the substrates, according to an electric field, may vary as described above. Namely, the particles of the particle group 34, which have different colors, may each have a voltage range necessary for migration of the particles of the respective colors, and the voltage ranges for the particles vary depending on the color of the particles. In other words, the absolute value of the voltage necessary to migrate each respective particle of the particle group 34 falls within a voltage range that corresponds to the color of that particles and the respective voltage ranges of the particles vary depending on the color of the particles.

In this exemplary embodiment, as shown in FIG. 1, the particle group 34 enclosed in one cell in the display medium 12 includes particles of 3 colors, that is, magenta particles 34M of magenta color, cyan particles 34C of cyan color, and yellow particles 34Y of yellow color.

The following description assumes that the absolute values of the voltages at the respective starts of migration of the magenta particles 34M of magenta color, the cyan particles 34C of cyan color, and the yellow particles 34Y of yellow color (i.e. the particle group 34 having three colors), are $|Vtm|$ for the magenta particles 34M of magenta color, $|Vtc|$ for the cyan particles 34C of cyan color, and $|Vty|$ for the yellow particles 34Y of yellow color, respectively. It is further assumed that the absolute values of the maximum voltages at which almost all of the respective particles of the particle group 34 (i.e. the magenta particles 34M of magenta color, the cyan particles 34C of cyan color, or the yellow particles 34Y of yellow color) migrate, are $|Vdm|$ for the magenta particles 34M of magenta color, $|Vdc|$ for the cyan particles 34C of cyan color, and $|Vdy|$ for the yellow particles 34Y of yellow color, respectively.

The following description will also be made assuming that the absolute values of Vtc, −Vtc, Vdc, −Vdc, Vtm, −Vtm, Vdm, −Vdm, Vty, −Vty, Vdy, and −Vdy have the relationship: $|Vtc|<|Vdc|<|Vtm|<|Vdm|<|Vty|<|Vdy|$.

As shown in FIG. 2, all of the particles of the particle group 34 may be charged to have the same polarity, and the absolute value $|Vtc \leq Vc \leq Vdc|$ (i.e. the absolute value between Vtc and Vdc) of the voltage range necessary for migration of the cyan particles 34C, the absolute value $|Vtm \leq Vm \leq Vdm|$ (i.e. the absolute value between Vtm and Vdm) of the voltage range necessary for migration of the magenta particles 34M, and the absolute value $|Vty \leq Vy \leq Vdy|$ (i.e. the absolute value between Vty and Vdy) of the voltage range necessary for migration of the yellow particles 34Y, may be respectively set to increase in this order without overlapping with one another.

For independent driving of each of the particles having different colors, which are included in the particle group 34, the absolute value $|Vdc|$ of the maximum voltage for migration of almost all the cyan particles 34C may be set to be lower than the absolute value $|Vtm \leq Vm \leq Vdm|$ (i.e. absolute value between Vtm and Vdm) of the voltage range necessary for migration of the magenta particles 34M, and also than the absolute value |Vty|≦|Vy|≦|Vdy| (i.e. absolute value between Vty and Vdy) of the voltage range necessary for migration of the yellow particles 34Y. In addition, the absolute value |Vdm| of the maximum voltage for migration of almost all the magenta particles 34M may be set to be lower than the absolute value |Vty|≦|Vy|≦|Vdy| (i.e. absolute value between Vty and Vdy) of the voltage range necessary for migration of the yellow particle group 34Y.

That is, in this exemplary embodiment, the voltage ranges necessary for migration of the respective particles having different colors of the particle group 34 are set so as not to overlap with one another; thereby, the respective particles having different colors of particle groups 34 may be driven independently.

The phrase "voltage range(s) necessary for migration of the respective particles of the particle group 34" refers to a voltage range from the voltage necessary for the particles to start to migrate, to a voltage at which the display density does not change and is saturated, even if the voltage and the voltage application time are increased, after the particles have started to migrate.

The phrase "maximum voltage necessary for migration of almost all of the respective particles of the particle group 34" refers to a voltage at which the display density does not change and is saturated, even if the voltage and the voltage application time are increased, after the particles have started to migrate.

The term "almost all" is used because there are variations in the characteristics of part of each of the respective particles having different colors of particle group 34, but not to an extent that affects display characteristics. That is, when "almost all" of the particles have migrated, then even if the voltage and the voltage application time are further increased, the display density does not change and is saturated.

The "display density" refers to a color density on the display side, which is measured as an optical density (OD). The optical density (OD) may be measured with a reflection densitometer (manufactured by X-rite) under conditions in which a voltage is applied between the display side and the rear side and the voltage is gradually changed (i.e. increased or decreased) so that the measured density increases with the change in voltage. Then, the display density as the optical density is determined when the change in density per unit voltage reaches saturation, and no further change in density occurs, and the density remains saturated even if the voltage and voltage application time are increased.

For example, when a voltage is applied between the display substrate 20 and the rear substrate 22, with the voltage level being gradually increased from 0 V, and the voltage applied between the substrates exceeds +Vtc, the display density starts to change owing to the migration of the cyan particles 34C in the display medium 12. When the voltage level is further increased and the voltage applied between the substrates reaches +Vdc, the change in the display density due to the migration of the cyan particles 34 in the display medium 12 stops.

When the voltage level is further increased such that the voltage applied between the display substrate 20 and the rear substrate 22 exceeds +Vtm, the display density starts to change owing to the migration of the magenta particle group 34M in the display medium 12. When the voltage level is further increased such that the voltage applied between the display substrate 20 and the rear substrate 22 reaches +Vdm, the change in the display density due to the migration of the magenta particles 34M in the display medium 12 stops.

When the voltage level is further increased such that the voltage applied between the substrates exceeds +Vty, the display density again starts to change owing to the migration of the yellow particles 34Y in the display medium 12. When the voltage level is further increased such that the voltage applied between the substrates reaches +Vdy, the change in the display density due to the migration of the yellow particles 34Y in the display medium 12 stops.

On the other hand, when a negative voltage is applied between the display substrate 20 and the rear substrate 22, with the absolute value of the voltage being gradually increased from 0 V, and the absolute value of the voltage applied between the substrates exceeds the absolute value of the voltage level −Vtc, the display density starts to change owing to the migration of the cyan particles 34C between the substrates in the display medium 12. When the absolute value of the voltage level is further increased such that the voltage applied between the display substrate 20 and the rear substrate 22 reaches −Vdc, the change in the display density due to the migration of the cyan particles 34C in the display medium 12 stops.

When a negative voltage is further applied between the display substrate 20 and the rear substrate 22, with the absolute value of the voltage being gradually further increased, and the absolute value of the voltage applied between the substrates exceeds the absolute value of −Vtm, the display density starts to change owing to the migration of the magenta particles 34M in the display medium 12. When the absolute value of the voltage level is further increased such that the voltage applied between the display substrate 20 and the rear substrate 22 reaches −Vdm, the change in the display density due to the migration of the magenta particles 34M in the display medium 12 stops.

When a negative voltage is further applied between the display substrate 20 and the rear substrate 22, with the absolute value of the voltage being gradually further increased, and the absolute value of the voltage applied between the substrates exceeds the absolute value of −Vty, the display density starts to change owing to the migration of the yellow particles 34Y in the display medium 12. When the absolute value of the voltage level is further increased such that the voltage applied between the substrates reaches −Vdy, the change in the display density due to the migration of the yellow particles 34C in the display medium 12 stops.

More specifically, according to the present exemplary embodiment, as shown in FIG. 2, when a voltage of from −Vtc to +Vtc (i.e. the absolute value of the voltage is |Vtc| or less) is applied between the display substrate 20 and the rear substrate 22, there is no substantial migration of the particles of the particle group 34 (including the cyan particles 34C, the magenta particles 34M, and the yellow particles 34Y) to the extent that the display density of the display medium 12 is changed. When a voltage having an absolute value greater than that of +Vtc and −Vtc is applied between the substrates, the cyan particles 34C start migrating to the extent that the display density of the display medium 12 starts to change, thereby changing the display density. When a voltage having an absolute value of |Vdc| or more, which is the absolute value of the voltages −Vdc and +Vdc, is applied between the substrates, no change occurs in the display density per unit voltage.

Further, when a voltage of from −Vtm to +Vtm (i.e. the absolute value of the voltage is |Vtm| or less but greater than |Vdc|) is applied between the display substrate 20 and the rear substrate 22, there is no substantial migration of the magenta particles 34M and the yellow particles 34Y to the extent that the display density of the display medium is changed. When a voltage having an absolute value greater than that of +Vtm and −Vtm is applied between the substrates, the magenta particles 34M out of the magenta particles 34M and the yellow particles 34Y start migrating to the extent that the display density of the display medium 12 starts to change, thereby changing the display density per voltage unit. When a voltage having an absolute value of |Vdm| or more, which is the absolute value of the voltage −Vdm and Vdm, is applied between the substrates, no change occurs in the display density per unit voltage.

Further, when a voltage of from −Vty to +Vty (i.e. the absolute value of the voltage is |Vty| or less but higher than |Vdm|) is applied between the display substrate 20 and the rear substrate 22, there is no substantial migration of the yellow particles 34Y to the extent that the display density of the display medium 12 is changed. When a voltage having an absolute value greater than that of +Vty and −Vty is applied between the substrates, the yellow particles 34Y start migrating to the extent that the display density of the display medium 12 starts to change, thereby changing the display density. When a voltage having an absolute value of |Vdy| or more, which is the absolute value of the voltage −Vdy and +Vdy, is applied between the substrate, no change occurs in the display density.

Then, the mechanism of particle migration for displaying an image on the display medium 12 of the invention is described with reference to FIGS. 3A to 3I.

The mechanism of particle migration is described with reference to a display medium 12 in which yellow particles 34Y, magenta particles 34M, and cyan particles 34C, which have been described by referring to FIG. 2, are enclosed as plural kinds of particles of the particle group 34.

Hereinafter, the voltage which is larger than the absolute value of the voltage required for the yellow particles 34Y to start migration and which is equal to or lower than the maximum voltage for the yellow particles 34Y may be referred to as "large voltage"; the voltage which is larger than the absolute value of the voltage required for the magenta particles 34M to start migration and which is equal to or lower than the maximum voltage for the magenta particles 34M may be referred to as "medium voltage"; and the voltage which is larger than the absolute value of the voltage required for the cyan particles 34C to start migration and which is equal to or lower than the maximum voltage for the cyan particles 34C may be referred to as "small voltage".

In cases where a higher voltage is applied to the display substrate 20 than that applied to the rear substrate 22, the respective voltages may be referred to as "positive(+) large voltage", "positive(+) medium voltage", and "positive(+) small voltage", respectively. On the other hand, in cases where a higher voltage is applied to the rear substrate 22 than that applied to the display substrate 20, the respective voltages may be referred to as "negative(−) large voltage", "negative(−) medium voltage", and "negative(−) small voltage", respectively.

As shown in FIG. 3A, the assumption is made that all of the magenta particles 34M, the cyan particles 34C, and the yellow particles 34Y are located on the rear substrate 22 side in the initial state. When a "positive(+) large voltage" is applied between the display substrate 20 and the rear substrate 22, all of the magenta particles 34M, the cyan particles 34C, and the yellow particles 34Y move to the display substrate 20 side from the initial state. Even when the application of the voltage is stopped in this state, each of the particles remains attached and does not move from the display substrate 20 side, whereby a black color remains displayed by the subtractive color mixture of the magenta particles 34M, the cyan particles 34C, and the yellow particles 34Y (i.e. subtractive color mixture of magenta, cyan, and yellow colors) (see FIG. 3B).

When a "negative(−) medium voltage" is applied between the display substrate 20 and the rear substrate 22 in the state as shown in FIG. 3B, the magenta particles 34M and the cyan particles 34C, out of all of the particles having different colors of the particle group 34, migrates to the rear substrate 22 side. Accordingly, only the yellow particles 34Y remain attached on the display substrate 20 side, whereby a yellow color may be displayed (see FIG. 3C).

Furthermore, when a "positive(+) small voltage" is applied between the display substrate 20 and the rear substrate 22 in the state as shown in FIG. 3C, the cyan particles 34C, out of the magenta particles 34M and the cyan particles 34C which have migrated to the rear substrate 22 side, migrate from the rear substrate 22 side to the display substrate 20 side. Accordingly, the yellow particles 34Y and the cyan particles 34C are attached on the display substrate 20 side, whereby a green color due to the subtractive color mixture of yellow and cyan may be displayed (see FIG. 3D).

On the other hand, when a "negative(−) small voltage" is applied between the display substrate 20 and the rear substrate 22 in the state as shown in FIG. 3B, the cyan particles 34C, out of all of the particles of the particle group 34, migrate to the rear substrate 22 side. Accordingly, the yellow particles 34Y and the magenta particles 34M remain attached on the display substrate 20 side, whereby a red color due to the subtractive color mixture of yellow and magenta may be displayed (see FIG. 3I).

On the other hand, when a "positive(+) medium voltage" is applied between the display substrate 20 and the rear substrate 22 in the initial state as shown in FIG. 3A, the magenta particles 34M and the cyan particles 34C, out of all of the particles of the particle group 34 (i.e. the magenta particles 34M, the cyan particles 34C, and the yellow particles 34Y), migrate to the display substrate 20 side. Accordingly, the magenta particles 34M and the cyan particles 34C are attached on the display substrate 20 side, whereby a blue color due to the subtractive color mixture of magenta and cyan may be displayed (see FIG. 3E).

When a "negative(−) small voltage" is applied between the display substrate 20 and the rear substrate 22 in the state as shown in FIG. 3E, the cyan particles 34C, out of the magenta particles 34M and the cyan particles 34C which have been attached on the display substrate 20 side, migrate from the display substrate 20 side to the rear substrate 22 side.

Accordingly, only the magenta particles 34M remain attached on the display substrate 20 side, whereby a magenta color may be displayed (see FIG. 3F).

When a "negative(−) large voltage" is applied between the display substrate 20 and the rear substrate 22 in the state as shown in FIG. 3F, the magenta particles 34M which have been attached on the display substrate 20 side migrate therefrom to the rear substrate 22 side.

Accordingly, no particles remain on the display substrate 20 side, whereby a white color of the insulating particles 36 may be displayed (see FIG. 3G).

On the other hand, when a "positive(+) small voltage" is applied between the display substrate 20 and the rear substrate 22 in the initial state as shown in the FIG. 3A, the cyan particles 34C, out of all of the particles of the particle group 34 (i.e. the magenta particles 34M, the cyan particles 34C, and the yellow particles 34Y), migrate to the display substrate 20 side. Accordingly, the cyan particles 34C are attached on the display substrate 20 side, whereby a cyan color may be displayed (see FIG. 3H).

Furthermore, when a "negative(−) large voltage" is applied between the display substrate 20 and the rear substrate 22 in the state as shown in the FIG. 3I, all of the particles of the particle group 34 migrate to the rear substrate 22 side as shown in FIG. 3G, whereby a white color may be displayed.

Similarly, when a "negative(−) large voltage" is applied between the display substrate 20 and the rear substrate 22 in the state as shown in the FIG. 3D, all of the particles of the particle group 34 migrate to the rear substrate 22 as shown in FIG. 3G, whereby a white color may be displayed.

In the exemplary embodiment as described above, voltages respectively corresponding to the particles of the particle group 34 may be applied between the substrates, whereby a desired particle group may be migrated owing to an electric field formed by the voltage. Therefore, the particles having colors other than the desired color may be prevented from migrating in the dispersion medium 50, and the mixing of undesirable colors may be reduced, whereby a color display may be obtained while the deterioration of the image quality of the display medium 12 is inhibited. When the absolute values of the voltages for migration owing to an electric field vary among the particles of the particle group 34, vivid color display may be realized even when the voltage range necessary for migration of particles having a color overlaps with that of particles having a different color. However, color mixing may be further suppressed, and color display further realized, when the respective voltage ranges of the particles are different from one another.

By dispersing the particle group 34 including particles of three colors (i.e. cyan, magenta, and yellow) in the dispersion medium 50, cyan, magenta, yellow, blue, red, green, and black colors may be displayed, and a white color may be displayed by the white insulating particles 36. Accordingly, desired colors may be displayed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

Hereinafter, the present invention is described in more detail with reference to Examples.

Example 1

First, 95 parts by weight of a silicone monomer (trade name, SILAPLANE FM-0711, manufactured by Cisso Corporation), and 5 parts by weight of glycidyl methacrylate are mixed with 100 parts by weight of silicone oil. 0.5 part by weight of 2,2'-azobis(2,4-dimethylvaleronitrile) (trade name: V-65, manufactured by Wako Pure Chemical Industries, Ltd.) is added as a polymerization initiator thereto to initiate polymerization at 55° C. for 10 hours, thereby preparing a reactive silicone polymer A having an epoxy group (i.e. reactive dispersant). The weight-average molecular weight of this polymer is 400,000. The polymer is diluted with silicone oil, thereby preparing a 3 weight % reactive silicone polymer A solution in silicone oil. As the silicone oil, dimethyl silicone oil (trade name: KF-96L 2 CS, manufactured by Shin-Etsu Silicone Co., Ltd.) is used.

Commercially-available polymethacrylic acid (weight-average molecular weight 50,000, manufactured by Wako Pure Chemical Industries, Ltd.) as a polymer having a charging group, is dissolved in water, thereby preparing a 10 weight % aqueous solution. Then, 3 parts by weight of the 10 weight % aqueous polymethacrylic acid solution thus prepared and 0.36 part by weight of triethylamine are mixed with 1 part by weight of an aqueous pigment dispersion (registered name: UNISPERSE, manufactured by Ciba; magenta color, pigment concentration of 16% by weight). This mixed solution is mixed with 10 parts by weight of the 3 weight % reactive silicone polymer A solution in silicone oil thus prepared, and the whole is stirred with an ultrasonic disintegrator (trade name: UH-600S, manufactured by S.M.T.) for 10 minutes, thereby preparing a suspension in which the aqueous solution including the polymer having a charging group and the pigment is dispersed and emulsified in the silicone oil.

Then, this suspension is heated at 70° C. under a reduced pressure of 2 KPa for 1 hour to remove water contents, thereby preparing a silicone oil dispersion in which magenta colored particles including the polymer having a charging group and the pigment are dispersed in the silicone oil. Further, this dispersion is heated at 100° C. for 3 hours, whereby the reactive silicone polymer A is reacted with and bound to the surfaces of the colored particles. After the reaction, the particles are precipitated with a centrifuge and washed with silicone oil, and this procedure is carried out repeatedly for purification. The concentration is adjusted with silicone oil, thereby preparing a 5 weight % display particle dispersion. The amount of the reactive silicone polymer that has been bound to the surface of the colored particles is determined by elemental analysis, and is found to be 16% by weight with respect to the weight of the particles. The volume-average particle size of the thus-prepared particle dispersion as determined with a laser diffraction particle size distribution analyzer (trade name: LA-300, manufactured by Horiba, Ltd.) is 400 nm.

The charging polarity of electrophoresed particles in the dispersion system is determined by enclosing the dispersion between 2 electrode substrates and evaluating the migration direction thereof by applying DC voltage, and is found to be negative.

Example 2

First, 95 parts by weight of a silicone monomer (trade name: SILAPLANE FM-0711, manufactured by Cisso Corporation), 3 parts by weight of methyl methacrylate, and 2 parts by weight of glycidyl methacrylate are mixed with 50 parts by weight of silicone oil. As a polymerization initiator, 0.5 part by weight of 2,2'-azobis(2,4-dimethylvaleronitrile) (trade name: V-65, manufactured by Wako Pure Chemical Industries, Ltd.) is added thereto to initiate polymerization, thereby preparing a reactive silicone polymer B having an epoxy group (i.e. reactive dispersant). The weight-average molecular weight of this polymer is 600,000. Then, a 3 weight % reactive silicone polymer B solution in silicone oil is prepared. As the silicone oil, dimethyl silicone oil (trade name: KF-96L 2 CS, manufactured by Shin-Etsu Silicone Co., Ltd.) is used.

As a polymer having a charging group, a copolymer (weight-average molecular weight 60,000) is obtained by usual radical solution polymerization of N-vinylpyrrolidone and N,N-diethylaminoethyl acrylate in a weight ratio (N-vinylpyrrolidone/N,N-diethylaminoethyl acrylate) of 9/1.

Then, 3 parts by weight of a 10 weight % aqueous solution of the copolymer is mixed with 1 part by weight of an aqueous pigment dispersion (registered name: UNISPERSE, manufactured by Ciba; cyan color, pigment concentration of 26% by weight). This mixed solution is mixed with 10 parts by weight of the 3 weight % reactive silicone polymer B solution in silicone oil, and the whole is stirred with an ultrasonic disintegrator for 10 minutes, thereby preparing a suspension in which the aqueous solution including the polymer having a charging group and the pigment is dispersed and emulsified in silicone oil.

Then, the suspension is heated at 70° C. under a reduced pressure of 2 KPa to remove water contents, thereby preparing a silicone oil dispersion in which colored particles including the polymer having a charging group and the pigment are dispersed in silicone oil. Further, this dispersion is heated at 100° C. for 3 hours, whereby the reactive silicone polymer is reacted with and bound to the surfaces of the colored particles. Then, butyl bromide in an amount of 50% with respect to the molar amount of N,N-diethylaminoethyl acrylate included in the solid contents of the particles is added to the dispersion, and the mixture is heated at 80° C. for 3 hours, to quaternize the amino group. Thereafter, the particles are precipitated with a centrifuge and washed with silicone oil, and this procedure is carried out repeatedly for purification. In this way, a display particle dispersion including 5 weight % of solid contents of the particles is prepared. The amount of the reactive silicone polymer which has been bound to the surface of the colored particles is determined by elemental analysis, and is found to be 20% by weight with respect to the weight of the particles. The volume-average particle size of the prepared particle dispersion as determined with a laser diffraction particle size distribution analyzer (trade name: LA-300, manufactured by Horiba, Ltd.) is 380 nm.

The charging polarity of electrophoresed particles in the dispersion system is determined by enclosing the dispersion between 2 electrode substrates and evaluating the migration direction thereof by applying DC voltage, and is found to be positive.

Example 3

By using the dispersant B in Example 2 as the reactive silicone dispersant, 3 weight % silicone oil is prepared.

Then, poly(acrylamide-2-methylpropanesulfonic acid) (PAMPS) (weight-average molecular weight of 80,000) as the polymer having a charging group is synthesized by usual radical solution polymerization, and a 10 weight % aqueous solution thereof is prepared. Then, 3 parts by weight of the 10% PAMPS aqueous solution and 0.4 part by weight of trihexylamine are mixed with 1 part by weight of an aqueous pigment dispersion (registered name: UNISPERSE, manufactured by Ciba; cyan color, pigment concentration of 26% by weight). This mixed solution is mixed with 10 parts by weight of the 3 weight % reactive silicone polymer B solution in silicone oil, and the whole is stirred with an ultrasonic disintegrator for 10 minutes, thereby preparing a suspension in which the aqueous solution including the polymer having a charging group and the pigment is dispersed and emulsified in silicone oil.

Then, the suspension is heated at 70° C. under a reduced pressure of 2 KPa to remove water contents, thereby preparing a silicone oil dispersion in which cyan colored particles including the polymer having a charging group and the pigment is dispersed in silicone oil. Further, the dispersion is heated at 100° C. for 3 hours, whereby the reactive silicone polymer is reacted with and bound to the surfaces of the colored particles. After the reaction, the particles are precipitated with a centrifuge and washed with silicone oil, and this procedure is carried out repeatedly for purification. The concentration is adjusted with silicone oil to prepare a 5 weight % display particle dispersion. The amount of the reactive silicone polymer which has been bound to the surfaces of the colored particles is determined by elemental analysis, and is found to be 25% by weight with respect to the weight of the particles. The median size of the thus-prepared particle dispersion as determined with a laser diffraction particle size distribution analyzer (trade name: LA-300, manufactured by Horiba, Ltd.) is 350 nm.

The charging polarity of electrophoresed particles in the dispersion system is determined by enclosing the dispersion between 2 electrode substrates and evaluating the migration direction thereof by applying DC voltage, and is found to be negative.

Example 4

95 parts by weight of a silicone monomer (trade name: SILAPLANE FM-0711, manufactured by Cisso Corporation), 3 parts by weight of methyl methacrylate, and 2 parts by weight of an isocyanate monomer (registered name: KARENZ MOI, manufactured by Showa Denko K.K.) are mixed with 100 parts by weight of silicone oil. 0.5 part by weight of 2,2'-azobis(2,4-dimethylvaleronitrile) (trade name: V-65, manufactured by Wako Pure Chemical Industries, Ltd.) is added as a polymerization initiator to initiate polymerization, thereby preparing a reactive silicone polymer C having an isocyanate group (i.e. reactive dispersant). The weight-average molecular weight of this polymer is 450,000. Then, a 3 weight % reactive silicone polymer C solution in silicone oil is prepared. As the silicone oil, dimethyl silicone oil (trade name: KF-96L 2CS, manufactured by Shin-Etsu Silicone Co., Ltd.) is used.

As the polymer having a charging group, a copolymer (weight-average molecular weight of 30,000) is obtained by usual radical solution polymerization of hydroxyethyl acrylate and diethylaminoethyl acrylate in a weight ratio (hydroxyethyl acrylate/diethylaminoethyl acrylate) of 9/1.

Then, 3 parts by weight of the 10 weight % copolymer aqueous solution are mixed with 1 part by weight of an aqueous pigment dispersion (registered name: UNISPERSE, manufactured by Ciba; magenta color, pigment concentration of 16% by weight). This mixed solution is mixed with 10 parts by weight of the 3 weight % reactive silicone polymer C solution in silicone oil, and the whole is stirred with an ultrasonic disintegrator for 10 minutes, thereby preparing a suspension in which the aqueous solution including the polymer having a charging group and the pigment is dispersed and emulsified in silicone oil.

Then, this suspension is heated at 70° C. under a reduced pressure of 2 KPa to remove water contents, thereby preparing a silicone oil dispersion in which colored particles containing the polymer having a charging group and the pigment are dispersed in silicone oil. Further, the dispersion is heated at 80° C. for 3 hours, whereby the reactive silicone polymer is reacted with and bound to the surfaces of the colored particles. Then, butyl bromide in an amount of 50% relative to the molar amount of N,N-dimethylaminoethyl acrylate in the solid contents of the particles is added to the dispersion, and the mixture is heated at 80° C. for 3 hours, to quaternize the amino group. Thereafter, the particles are precipitated with a centrifuge and washed with silicone oil, and this procedure is carried out repeatedly for purification. In this way, a display particle dispersion including 5 weight % of solid contents of the particles is prepared. The amount of the reactive silicone polymer which has been bound to the surfaces of the colored particles is determined by elemental analysis, and is found to be 25% by weight with respect to the weight of the particles. The median size of the prepared particle dispersion as determined with a laser diffraction particle size distribution analyzer (trade name: LA-300, manufactured by Horiba, Ltd.) is 300 nm.

The charging polarity of electrophoresed particles in this dispersion system is determined by enclosing the dispersion between 2 electrode substrates and evaluating the migration direction thereof by applying DC voltage, and is found to be positive.

Example 5

96 parts by weight of dodecyl methacrylate, that is, a long-chain alkyl monomer, 2 parts by weight of hydroxyethyl methacrylate, and 2 parts by weight of glycidyl methacrylate are mixed in 100 parts by weight of toluene. As a polymerization initiator, 0.5 part by weight of 2,2'-azobis(2,4-dimethylvaleronitrile) (trade name: V-65, manufactured by Wako Pure Chemical Industries, Ltd.) is added to initiate polymerization, thereby preparing a reactive long-chain alkyl polymer D having an epoxy group (i.e. reactive dispersant). The weight-average molecular weight of this polymer is 200,000. Then, a 3 weight % reactive long-chain alkyl polymer D solution in ISOPAR M (trade name, manufactured by Exxon Corporation) is prepared.

Then, poly(acrylamide-2-methylpropanesulfonic acid) (PAMPS) as used in Example 3 is used as the polymer having a charging group, to prepare a 10 weight % aqueous solution thereof. Then, 3 parts by weight of the 10% PAMPS aqueous solution and 0.4 part by weight of trihexylamine are mixed with 1 part by weight of an aqueous pigment dispersion (registered name: UNISPERSE, manufactured by Ciba; magenta color, pigment concentration of 16% by weight). This mixed solution is mixed with 10 parts by weight of the 3 weight % reactive long-chain alkyl polymer D solution in ISOPAR, and the whole is stirred with an ultrasonic disintegrator, thereby preparing a suspension in which the aqueous solution including the polymer having a charging group and the pigment is dispersed and emulsified in ISOPAR.

Then, the suspension is heated at 70° C. under a reduced pressure of 2 KPa to remove water contents, thereby preparing an ISOPAR dispersion in which magenta colored particles including the polymer having a charging group and the pigment are dispersed in ISOPAR. Further, this dispersion is heated at 100° C. for 3 hours, whereby the reactive long-chain alkyl polymer is reacted with and bound to the surfaces of the colored particles. The particles are precipitated with a centrifuge and washed with ISOPAR, and this procedure is carried out repeatedly for purification. In this way, a display particle dispersion including 5 weight % of solid contents of the particles is prepared. The amount of the reactive long-chain alkyl polymer which has been bound to the surfaces of the colored particles is determined by elemental analysis, and is found to be 15% by weight with respect to the weight of the particles. The median size of the prepared particle dispersion as determined with a laser diffraction particle size distribution analyzer (trade name: LA-300, manufactured by Horiba, Ltd.) is 260 nm.

The charging polarity of electrophoresed particles in this dispersion system is determined by enclosing the dispersion between 2 electrode substrates and evaluating the migration direction thereof by applying DC voltage, and is found to be negative.

Example 6

95 parts by weight of dodecyl methacrylate, that is, a long-chain alkyl monomer, 3 parts by weight of methyl methacrylate, and 2 parts by weight of an isocyanate monomer (registered name: KARENZ MOI, manufactured by Showa Denko K.K.) are mixed with 100 parts by weight of toluene. 0.5 part by weight of 2,2'-azobis(2,4-dimethylvaleronitrile) (trade name: V-65, manufactured by Wako Pure Chemical Industries, Ltd.) is added as a polymerization initiator, to initiate polymerization, thereby preparing a reactive long-chain alkyl polymer E having an isocyanate group (i.e. reactive dispersant). The weight-average molecular weight of this polymer is 350,000. Then, a 3 weight % reactive long-chain alkyl polymer E solution in ISOPAR M (trade name, manufactured by Exxon Corporation) is prepared.

Then, the same copolymer consisting of N-vinylpyrrolidone and N,N-diethylaminoethyl acrylate in a weight ratio (N-vinylpyrrolidone/N,N-diethylaminoethyl) of 9/1 as used in Example 2 is used as the polymer having a charging group, to prepare a 10 weight % aqueous solution thereof. Then, 3 parts by weight of the 10% aqueous solution including the copolymer of N-vinylpyrrolidone and N,N-diethylaminoethyl acrylate and 10 parts by weight of the 3 weight % reactive long-chain alkyl polymer E solution in ISOPAR are mixed with 1 part by weight of an aqueous pigment dispersion (registered name: UNISPERSE, manufactured by Ciba; cyan color, pigment concentration of 26% by weight). This mixed solution is stirred with an ultrasonic disintegrator, thereby preparing a suspension in which the aqueous solution including the polymer having a charging group and the pigment is dispersed and emulsified in ISOPAR.

Then, the suspension is heated at 70° C. under a reduced pressure of 2 KPa to remove water contents, thereby preparing an ISOPAR dispersion in which magenta colored particles including the polymer having a charging group and the pigment are dispersed in ISOPAR. Further, this dispersion is heated at 80° C. for 3 hours, whereby the reactive long-chain alkyl polymer is reacted with and bound to the surfaces of the colored particles. Then, butyl bromide in an amount of 50% relative to the molar amount of N,N-diethylaminoethyl methacrylate in the solid contents of the particles is added to the dispersion, and the mixture is heated at 80° C. for 3 hours, to quaternize the amino group. Thereafter, the particles are precipitated with a centrifuge and washed with ISOPAR, and this procedure is carried out repeatedly for purification. In this way, a display particle dispersion including 5 weight % of solid contents of the particles is prepared. The amount of the reactive long-chain alkyl polymer which has been bound to the surfaces of the colored particles is determined by elemental analysis, and is found to be 21% by weight with respect to the weight of the particles. The median size of the prepared particle dispersion as determined with a laser diffraction particle size distribution analyzer (trade name: LA-300, manufactured by Horiba, Ltd.) is 310 nm.

The charging polarity of electrophoresed particles in this dispersion system is determined by enclosing the dispersion between 2 electrode substrates and evaluating the migration direction thereof by applying DC voltage, and is found to be positive.

Comparative Example 1

As the dispersant, a dispersant KP-545 (trade name, manufactured by Shin-Etsu Silicone Co., Ltd.) is used, and a 3 weight % solution thereof in silicone is prepared. KP-545 is a copolymer which is similar to SILAPLANE, obtained by using a silicone macromer, but does not include a reactive group such as an epoxy group or an isocyanate group.

Then, polymethacrylic acid (weight-average molecular weight 50,000) as used in Example 1 is used as the polymer having a charging group, to prepare a 10 weight % aqueous solution thereof. 3 parts by weight of the 10 weight % polymethacrylic acid solution and 0.36 part by weight of triethylamine are mixed with 1 part by weight of an aqueous pigment dispersion (registered name: UNISPERSE, manufactured by Ciba; magenta color, pigment concentration of 16% by weight). This mixed solution is mixed with 10 parts by weight of the 3 weight % KP-545 solution in silicone oil, and the whole is stirred with an ultrasonic disintegrator for 10 minutes, thereby preparing a suspension in which the aqueous solution including the polymer having a charging group and the pigment is dispersed and emulsified in silicone oil. As the silicone oil, dimethyl silicone oil (trade name: KF-96L 2CS, manufactured by Shin-Etsu Silicone Co., Ltd.) is used.

Then, this suspension is heated at 70° C. under a reduced pressure of 2 KPa for 1 hour to remove water contents, thereby preparing a silicone oil dispersion in which magenta colored particles including the polymer having a charging group and the pigment are dispersed in silicone oil. Thereafter, the particles are precipitated with a centrifuge and washed with silicone oil, and this procedure is carried out repeatedly for purification. The concentration is adjusted with silicone oil to prepare a 5 weight % display particle dispersion. The median size of the prepared particle dispersion before washing, as determined with a laser diffraction particle size distribution analyzer (trade name: LA-300, manufactured by Horiba Ltd.), is 320 nm.

The charging polarity of electrophoresed particles in this dispersion system is determined by enclosing the dispersion between 2 electrode substrates and evaluating the migration direction thereof by applying DC voltage, and is found to be negative.

Comparative Example 2

As the dispersant, the dispersant KP-545 (trade name, manufactured by Shin-Etsu Silicone Co., Ltd.) as used in Comparative Example 1 is used, and a 3 weight % solution thereof in silicone oil is prepared. As the silicone oil, dimethyl silicone oil (trade name: KF-96L 2CS, manufactured by Shin-Etsu Silicone Co., Ltd.) is used.

Then, the copolymer (weight-average molecular weight of 60,000) consisting of N-vinylpyrrolidone and N,N-diethylaminoethyl acrylate in a weight ratio (N-vinylpyrrolidone/N,N-diethylaminoethyl acrylate) of 9/1 as used in Example 2 is used as the polymer having a charging group, to prepare a 3 weight % aqueous solution thereof.

3 parts by weight of the polymer solution and 0.36 part by weight of triethylamine are mixed with 1 part by weight of an aqueous pigment dispersion (registered name: UNISPERSE, manufactured by Ciba; cyan color, pigment concentration of 26% by weight). This mixed solution is mixed with 10 parts by weight of the 3 weight % KP-545 solution in silicone oil, and the whole is stirred with an ultrasonic disintegrator for 10 minutes, thereby preparing a suspension in which the aqueous solution including the polymer having a charging group and the pigment is dispersed and emulsified in silicone oil (trade name: KF-96L 2CS, manufactured by Shin-Etsu Silicone Co., Ltd.).

Then, the suspension is heated at 70° C. under a reduced pressure of 2 KPa for 1 hour to remove water contents, thereby preparing a silicone oil dispersion in which cyan colored particles including the polymer having a charging group and the pigment are dispersed in silicone oil (trade name: KF-96L 2CS, manufactured by Shin-Etsu Silicone Co., Ltd.). Then, butyl bromide in an amount of 50% relative to the molar amount of N,N-diethylaminoethyl acrylate in the solid contents of the particles is added to the dispersion, and the mixture is heated at 80° C. for 3 hours, to quaternize the amino group. Thereafter, the particles are precipitated with a centrifuge and washed with silicone oil, and this procedure is carried out repeatedly for purification. The concentration is adjusted with silicone oil (trade name: KF-96L 2CS, manufactured by Shin-Etsu Silicone Co., Ltd.) to prepare a 5 weight % display particle dispersion. The median size of the prepared particle dispersion before washing, as determined with a laser diffraction particle size distribution analyzer (trade name: LA-300, manufactured by Horiba, Ltd.), is 300 nm.

The charging polarity of electrophoresed particles in this dispersion system is determined by enclosing the dispersion between 2 electrode substrates and evaluating the migration direction thereof by applying DC voltage, and is found to be positive.

Evaluation

Dispersion Stability

The dispersion stability of the particles of the particle dispersions obtained in Examples and Comparative Examples are evaluated. The dispersion stability is evaluated as follows. The solution including 5 weight % of the prepared electrophoresis particles is dispersed with an ultrasonic dispersion device for 10 minutes, and left for 24 hours. Thereafter, the precipitation state of the particles in the dispersion and the aggregation of the particles are observed and evaluated with a laser diffraction particle size distribution analyzer (trade name: LA-300, manufactured by Horiba, Ltd.). The results are as follows.

Example 1: not precipitated, no change in particle size.
Example 2: not precipitated, no change in particle size.
Example 3: not precipitated, no change in particle size.
Example 4: not precipitated, no change in particle size.
Example 5: not precipitated, no change in particle size.
Example 6: not precipitated, no change in particle size.
Comparative Example 1: precipitated particles, an increase in particle size due to aggregation (volume-average particle size of 800 nm).
Comparative Example 2: precipitated particles, an increase in particle size due to aggregation (volume-average particle size of 920 nm).

As can be seen from the results, the dispersions in the Examples are superior in dispersion stability to the dispersions in the Comparative Examples.

Charging Stability

The charging stability of the particles of the particle dispersions obtained in Examples and Comparative Examples are evaluated. For determining the charging stability, electrophoresis characteristics of the dispersion before and after being left for 24 hours are evaluated by enclosing the electrophoresis solution between 2 electrode substrates and then observing the electrophoresis thereof upon application of DC voltage. The results are shown below.

Example 1: negatively charged, no change.

Example 2: positively charged, no change.

Example 3: negatively charged, no change.

Example 4: positively charged, no change.

Example 5: negatively charged, no change.

Example 6: positively charged, no change.

Comparative Example 1: (negatively charged) aggregates are formed, and a majority of the particles are not electrophoresed.

Comparative Example 2: (positively charged) aggregates are formed, and a majority of the particles are not electrophoresed.

As can be seen from the results, the dispersions in the Examples are superior in charging stability to the dispersions in the Comparative Examples.

Evaluation of mixture of two kinds of particles (i.e. positively charged particles and negatively charged particles)

The charging stability of the particles of the particle dispersions obtained in Examples and Comparative Examples are evaluated. For determining charging stability, electrophoresis characteristics of the dispersion before and after being left for 24 hours are evaluated by enclosing the electrophoresis solution between 2 electrode substrates and then observing the electrophoresis thereof upon application of DC voltage.

The particles having different charging polarities and different colors, which have been prepared in Examples 1 to 6 and Comparative Examples 1 and 2, are mixed to form 2-particle mixture systems, and then their dispersion stability is evaluated. This evaluation is carried out by examining a change in the mixture after 24 hours and by observing the electrophoresis between 2 electrodes as described above.

Mixture of Particles of Example 1 with Particles of Example 2

Both of the particles are dispersed without aggregation. In evaluation of electrophoresis, the respective particles are electrophoresed while maintaining their polarities to show stable charging stability.

Mixture of Particles of Example 3 with Particles of Example 4

Both of the particles are dispersed without aggregation. In evaluation of electrophoresis, the respective particles are electrophoresed while maintaining their polarities to show stable charging stability.

Mixture of Particles of Example 5 with Particles of Example 6

Both of the particles are dispersed without aggregation. In evaluation of electrophoresis, the respective particles are electrophoresed while maintaining their polarities to show stable charging stability.

Mixture of Particles of Comparative Example 1 with Particles of Comparative Example 2

The particles are aggregated to form coarse blue particles. In evaluation of electrophoresis, the positively charged particles are aggregated.

From the results, it is confirmed that when the two kinds of particles are mixed, the particles of Examples are superior in dispersion stability and charging stability to the particles of Comparative Examples.

Example 7

Preparation and Evaluation of Optical Element Models

Two ITO glass substrates (5 cm×10 cm, thickness 2 mm) are prepared, and these substrates are attached with a gap of 100 μm therebetween, in such a state that electrode substrate surfaces thereof opposes to each other, in an offset shape securing a part of an electrode surface for wiring and a tape spacer is formed in the periphery (with an opening formed partially), thereby preparing a cell structure (i.e. empty cell). Plural cell structures are prepared.

The 2-particle dispersion including the particles of Examples 1 and 2, the 2-particle dispersion including the particles of Examples 3 and 4, and the 2-particle dispersion including the particles of Examples 5 and 6 are each injected by an evacuation method through an opening of the cell (i.e. empty cell), and then the opening is sealed, thereby preparing 3 kinds of optical elements for evaluation.

When a DC current of 10 V having different polarity is applied to these optical elements, all of the elements display a magenta color and a cyan color alternately. The elements can repeatedly and stably display the colors after 100,000 times or more.

When the display density of a displayed color of magenta color or cyan color just after application of DC voltage is stopped (electric field: off), and the display density 24 hours after the application of the voltage is stopped, are measured with a X-rite (trade name, manufactured by X-rite), no change is observed, and stable memory property is exhibited.

What is claimed is:

1. A display particle, comprising:
  a colored particle including a polymer having a charging group and a colorant; and
  a reactive silicone polymer or a reactive long-chain alkyl polymer, the polymer being bound to or covering the surface of the colored particle:
  wherein the polymer having a charging group has a weight-average molecular weight of from 1,000 to 1,000,000, and the charging group comprises a cationic group or an anionic group.

2. The display particle of claim 1, wherein the reactive silicone polymer comprises a copolymer including a silicone chain component, a reactive component, and another copolymerizable component.

3. The display particle of claim 1, wherein the reactive silicone polymer or the reactive long-chain alkyl polymer has a weight-average molecular weight of from about 1,000 to about 1,000,000.

4. The display particle of claim 1, wherein the reactive long-chain alkyl polymer comprises a copolymer including a long-chain alkyl chain component, a reactive component, and another copolymerizable component.

5. The display particle of claim 4, wherein the long-chain alkyl chain component includes an alkyl chain having 4 or more carbon atoms.

6. A display particle dispersion, comprising:
  a particle group including the display particles of claim 1; and
  a dispersion medium in which the particle group is dispersed.

7. The display particle dispersion of claim 6, wherein the dispersion medium comprises silicone oil.

8. The display particle dispersion of claim 6, wherein the dispersion medium comprises a paraffin hydrocarbon solvent.

9. The display particle dispersion of claim 6, wherein the display particles included in the particle group have different charging polarities.

10. A display medium, comprising:
   a pair of substrates, at least one of which transmits light; and
   the display particle dispersion of claim 6, which is enclosed in a space between the pair of substrates.

11. A display device, comprising:
   the display medium of claim 10; and
   a voltage application unit which applies a voltage between the pair of substrates of the display medium.

12. A display medium, comprising:
   a pair of electrodes, at least one of which transmits light; and
   the display particle dispersion of claim 6, which is enclosed in a space between the pair of electrodes.

13. A display device, comprising:
   the display medium of claim 12; and
   a voltage application unit which applies a voltage between the pair of substrates of the display medium.

14. A method for producing a display particle, comprising:
   stirring and emulsifying a mixed solution including i) a polymer having a charging group, ii) a colorant, iii) a reactive silicone polymer or a reactive long-chain alkyl polymer, iv) a first solvent, and v) a second solvent which is incompatible with the first solvent, has a boiling point lower than that of the first solvent, and dissolves the polymer having a charging group;
   removing the second solvent from the emulsified mixed solution to produce a colored particle including the polymer having a charging group and the colorant; and
   reacting the reactive silicone polymer or the reactive long-chain alkyl polymer with the colored particle so that it binds to the surface of the colored particle or covers the surface of the colored particle;
   wherein the polymer having a charging group has a weight-average molecular weight of from 1,000 to 1,000,000, and the charging group comprises a cationic group or an anionic group.

15. The method for producing a display particle of claim 14, wherein the first solvent comprises silicone oil.

16. The method for producing a display particle of claim 14, wherein the first solvent comprises a paraffin hydrocarbon solvent.

17. A display particle, comprising:
   a colored particle including a polymer having a charging group and a colorant; and
   a reactive silicone polymer or a reactive long-chain alkyl polymer, the polymer being bound to or covering the surface of the colored particle;
   wherein the reactive long-chain alkyl polymer comprises a copolymer including a long-chain alkyl chain component, a reactive component, and another copolymerizable component.

18. The display particle of claim 17, wherein the long-chain alkyl chain component includes an alkyl chain having 4 or more carbon atoms.

19. A display particle dispersion, comprising:
   a particle group including display particles that each comprise:
      a colored particle including a polymer having a charging group and a colorant; and
      a reactive silicone polymer or a reactive long-chain alkyl polymer, the polymer being bound to or covering the surface of the colored particle; and
   a dispersion medium in which the particle group is dispersed, wherein the dispersion medium comprises a paraffin hydrocarbon solvent.

20. A method for producing a display particle, comprising:
   stirring and emulsifying a mixed solution including i) a polymer having a charging group, ii) a colorant, iii) a reactive silicone polymer or a reactive long-chain alkyl polymer, iv) a first solvent, and v) a second solvent which is incompatible with the first solvent, has a boiling point lower than that of the first solvent, and dissolves the polymer having a charging group;
   removing the second solvent from the emulsified mixed solution to produce a colored particle including the polymer having a charging group and the colorant; and
   reacting the reactive silicone polymer or the reactive long-chain alkyl polymer with the colored particle so that it binds to the surface of the colored particle or covers the surface of the colored particle;
   wherein the first solvent comprises a paraffin hydrocarbon solvent.

* * * * *